United States Patent [19]

Collins et al.

[11] 4,120,418

[45] Oct. 17, 1978

[54] METHOD OF PRODUCING A BARRIER IN A THERMALLY INSULATED CONTAINER

[75] Inventors: Michael H. Collins, Huxley, Nr. Chester; Jeremy D. Le Hardy Guiton, Chichester, both of England

[73] Assignee: Shell Internationale Research Maatschappij B.V., Netherlands

[21] Appl. No.: 693,215

[22] Filed: Jun. 4, 1976

[30] Foreign Application Priority Data

Sep. 30, 1975 [GB] United Kingdom ............... 39982/75

[51] Int. Cl.² ............................................. B65D 25/18
[52] U.S. Cl. ..................................... 220/444; 220/901; 427/181; 427/203; 427/204; 427/206; 427/230; 427/236; 427/239; 427/290; 427/292; 428/35; 428/315
[58] Field of Search ............... 427/140, 181, 203, 204, 427/206, 230, 236, 239, 289, 290, 292; 428/315, 425, 35; 114/74 A; 220/9 F, 18, 9 LG; 264/36, 31, 34

[56] References Cited

U.S. PATENT DOCUMENTS

| 2,928,456 | 3/1960 | Potchen et al. ............. 428/315 X |
| 3,163,434 | 12/1964 | Krueger ........................... 220/9 F X |
| 3,400,849 | 9/1968 | Pottier et al. ................... 220/9 F |
| 3,411,656 | 11/1968 | Jackson ............................ 220/9 F |
| 3,502,239 | 3/1970 | Worboys et al. ................. 220/9 F |
| 3,518,156 | 6/1970 | Windecker ...................... 428/315 X |
| 3,687,087 | 8/1972 | Yurkoski et al. ............... 220/9 F X |
| 3,698,972 | 10/1972 | Lenzner .......................... 427/289 X |
| 3,816,234 | 6/1974 | Burden ............................ 428/315 X |
| 3,902,941 | 9/1975 | Withers .......................... 220/9 F |
| 3,927,788 | 12/1975 | Zinniger et al. ............... 114/74 A X |
| 3,989,781 | 11/1976 | Chant ............................. 428/315 X |

FOREIGN PATENT DOCUMENTS 7,400,276 3/1974 Netherlands.

Primary Examiner—Shrive P. Beck
Attorney, Agent, or Firm—Pravel, Wilson & Gambrell

[57] ABSTRACT

A method for producing a barrier in a thermally insulated container lined with polyurethane foam for storage or transport of liquefied gases, wherein a plurality of layers of an epoxy resin formulation and a glass-fiber material are applied in a particular sequence resulting in a barrier of superior quality essentially free of pinhole flaws.

3 Claims, 4 Drawing Figures

METHOD OF PRODUCING A BARRIER IN A THERMALLY INSULATED CONTAINER

BACKGROUND OF THE INVENTION

The present invention relates to the manufacture of thermally insulated containers for storage or transport of liquefied gases.

Dutch patent application No. 7,400,276, published Mar. 25, 1974, and assigned to the assignee of the present invention, discloses a thermally insulated container for storage or transport of liquefied gases, in particular methane or natural gas, comprising a lining of polyurethane foam arranged on the inner surface of a rigid outer shell, wherein the lining of polyurethane foam is provided with a barrier consisting of glass-fiber material and an epoxy-resin system. Furthermore, said published Netherlands patent application discloses a method of producing said barrier in a container as mentioned above, which method comprises applying an epoxy resin formulation (which formulation comprises an epoxy resin and a curing agent) on polyurethane foam already applied onto the inner surface of the rigid outer shell, applying a layer of glass-fiber material to the said epoxy resin formulation, passing a roller over the glass-fiber material and the said epoxy resin formulation to obtain good wetting of the glass-fiber material by the said epoxy resin formulation and to ensure compaction and allowing the epoxy resin to cure.

The present invention particularly relates to an improved method of producing said barrier, so that the risk of pinhole flaws occurring in the barrier is reduced as much as possible.

SUMMARY OF THE INVENTION

The method according to the invention comprises the steps of:
 cutting or grinding the inner surface of polyurethane foam already applied onto the inner surface of a rigid outer shell so as to obtain a substantially flat cut or ground surface of polyurethane foam;
 applying a first layer of an epoxy resin formulation, comprising an epoxy resin and a curing agent, onto the cut or ground surface;
 allowing the epoxy-resin formulation of the first layer to gel;
 applying a second layer of an epoxy resin formulation, comprising an epoxy resin and a curing agent, onto the gelled first layer;
 applying a layer of glass-fiber material onto the second layer when the epoxy resin formulation of the second layer is still wet and compacting the glass-fiber material, for example, by passing a roller over it;
 applying a third layer of an epoxy resin formulation, comprising an epoxy resin and a curing agent, onto the second layer and glass-fiber material; and
 allowing the epoxy resin formulation of the second and third layers to gel.

BRIEF DESCRIPTION OF THE DRAWINGS

The invention will be further explained with reference to the drawings, wherein.

DESCRIPTION OF THE PREFERRED EMBODIMENT

In the specification and claims pertaining to the present patent application, allowing the epoxy resin formulation to gel means allowing the epoxy resin formulation to cure partly or fully.

Figure 1:
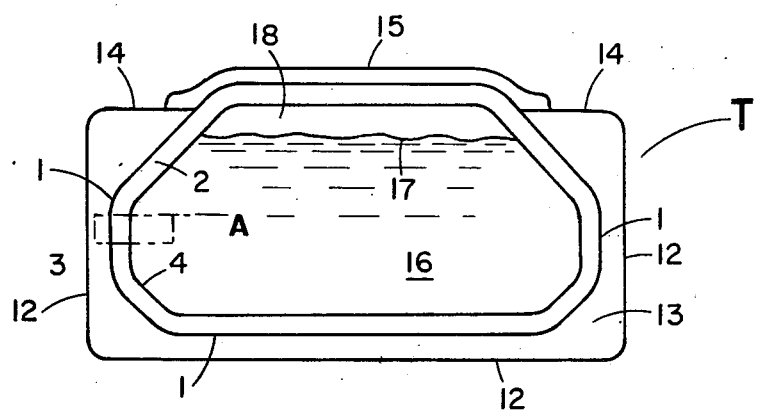
FIG. 1 is a schematic cross-sectional view through a marine tanker provided with a container of the type to which the invention applies.

Referring to the drawings, in FIG. 1 the marine tanker T comprises an outer hull 12, an inner hull 1 and a ballast space 13 between the said inner and outer hulls. The tanker T is provided with a main deck 14 and a trunk deck 15. The inner hull 1 functions as a rigid outer shell of the container for liquefied gas. The rigid outer shell 1 is normally made of steel, for example, grade E steel. A lining 2 of polyurethane foam is arranged on the inner surface 3 of the rigid outer shell 1. The polyurethane foam is preferably rigid polyurethane foam having preferably closed cells. The lining 2 is preferably applied by a spraying method, for example, by means of the apparatus as described in applicant's British Pat. No. 1,300,352, published on 20th Dec., 1972. The inner surface 4 of the polyurethane foam 2 is adapted to be in direct contact with the cargo of liquefied gas 16, for example, liquefied natural gas at a pressure of about 1 $kg/cm^2$ and at a temperature of about $-160°$ C. Above the liquid surface 17 a vapor space 18 is present.

Figure 2:
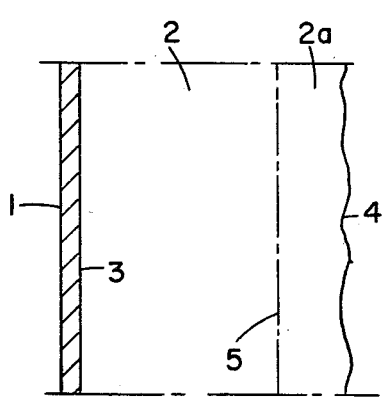
FIG. 2 is a schematic cross-sectional view of a fragment A of FIG. 1 illustrating an embodiment of a tank wall provided with a barrier.

Within the lining 2 of polyurethane foam at least one barrier 5 is arranged (FIG. 2). If desired, two, three or more spaced apart barriers 5 may be present in the lining 2.

Figure 3:
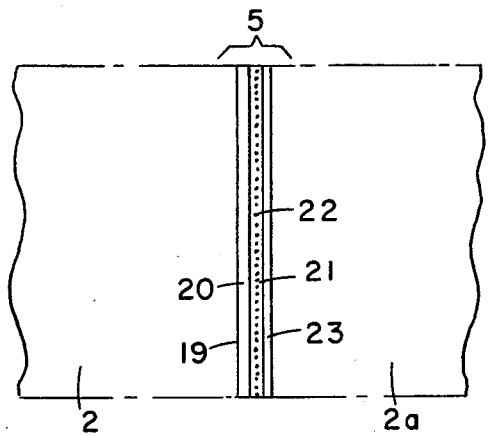
FIG. 3 is a partially cut away cross-section view of a first embodiment of a barrier applied according to the invention.

The barrier 5 is produced as follows:

Assume that polyurethane foam 2 has been applied onto the inner surface 3 of the rigid outer shell 1 until a certain thickness has been reached, depending on the desired location of the barrier 5, for example, at a distance of 200 to 250 mm from the inner surface 3. The inner surface of the polyurethane foam is cut or ground until a substantially flat surface 19 is obtained. A first thin layer 20 of an epoxy resin formulation which comprises an epoxy resin and a curing agent is applied, preferably by spraying, onto the cut or ground surface 19, whereafter the epoxy resin formulation of the first layer 20 is allowed to gel. Then a second layer 21 of an epoxy resin formulation, which formulation comprises an epoxy resin and a curing agent, is applied onto the gelled first layer 20. Thereafter, a layer of glass-fiber material 22, for example, glass-fiber cloth, is applied onto the said second layer 21, when the epoxy resin formulation of said second layer 21 is still wet and the glass-fiber material 22 is compacted, for example, by means of a roller. The compacting of the glass-fiber material 22 ensures good wetting of the glass-fiber material 22 by the epoxy-resin formulation of the second layer 21. After the compacting operation, a third layer 23 of an epoxy resin formulation, which comprises an epoxy resin and a curing agent, is applied onto the second layer 21, while it is still wet, and further compacting carried out as necessary. Thereafter, the said second layer 21 and third layer 23 are allowed to gel. In the above manner, a barrier 5 is obtained comprising only one layer of glass-fiber material 22 which is shown in FIG. 3. In the embodiment of FIG. 3, polyurethane foam 2a is applied on top of the third layer 23. If more than one barrier 5 is required, the above process is repeated one or more times so that a plurality of spaced-apart barriers 5 will be incorporated in the polyurethane foam 2.

Figure 4:
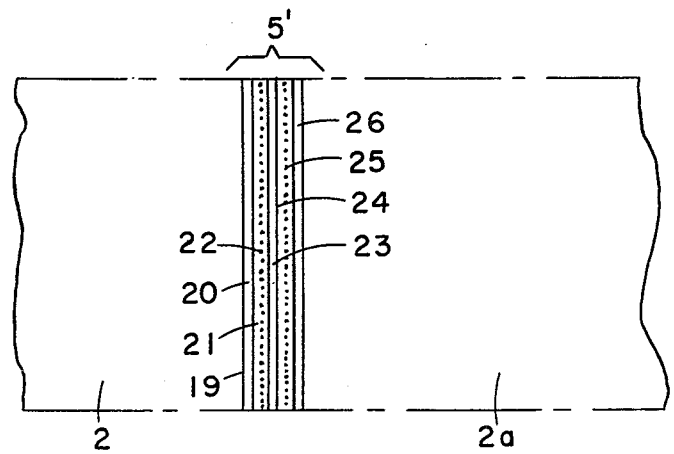
FIG. 4 is a partially cut away cross-section view of a second embodiment of a barrier applied according to the invention.

Often, it is desired to produce a barrier 5' as shown in FIG. 4, comprising two layers of glass-fiber material. Such a barrier 5' is produced by applying a fourth layer 24 of an epoxy resin formulation on the gelled third layer 23. This fourth layer 24 comprises an epoxy resin and a curing agent. Then a layer of glass-fiber material 25, for example, glass-fiber cloth, is applied onto the said fourth layer 24, when the epoxy resin formulation of said fourth layer 24 is still wet and the glass-fiber material 25 is compacted, for example, by means of a roller. The compacting of the glass-fiber material 25 ensures good wetting of the glass-fiber material 25 by the epoxy resin formulation of the fourth layer 24. After the compacting of the glass-fiber material 25, a fifth layer 26 of an epoxy resin formulation, which comprises an epoxy resin and a curing agent, is applied onto the fourth layer 26, while it is still wet and further compacting carried out as necessary, whereafter the fourth layer 24 and fifth layer 26 are allowed to gel. If more than two layers of glass-fiber material are required in the barrier 5, the above process is repeated one or more times depending on the desired number of layers of glass-fiber material. In the embodiment of FIG. 4, polyurethane foam 2a is applied on top of the cured fifth layer 26.

Preferably, the epoxy resin formulation as mentioned in the above, includes a thixotroping agent, and/or, if necessary, a flexibilizing component, such as a flexibilizing epoxy resin. Such epoxy resin formulations and respective components thereof are well-known in the art and are readily available commercially.

For further details about a preferred epoxy resin formulation, reference is made to the above-mentioned published Netherlands patent application.

A problem with barriers in heat-insulated containers for liquefied gases is that sometimes pinhole flaws occur in these barriers. These pinhole flaws can be detected in a simple manner by applying onto the cut or ground polyurethane foam surface a fluorescent dye before applying the barrier. If pinhole flaws are present, irradiating the surface of the barrier with ultraviolet light will cause fluorescence at the locations of the pinhole flaws. Pinhole flaws in the barrier have the disadvantage that some liquefied gas may penetrate through the barrier and may collect behind the barrier. When the container is emptied and the temperature of the container raises to ambient temperature, the said collected liquefied gas will evaporate and expand and may cause damage to the barrier.

The main object of the method according to the invention is to produce a barrier of very good quality so that the chance that pinhole flaws are present in the barrier is very small.

If desired, the barrier need not to be incorporated in the lining of polyurethane foam. Instead, it is possible to arrange the barrier on the inner surface of the polyurethane foam so that, when the container is in use, the liquefied gas stored in the container is in direct contact with the barrier and is not in direct contact with the polyurethane foam. Said barrier can be produced as well by means of the method according to the present invention.

The quantities of the epoxy resin formulation applied on top of the gelled first layer 20 range from 80–90% of the total quantity for the second layer 21 and from 10–20% of the total quantity for the third layer 23. Similarly, the quantities of the epoxy resin formulation applied on top of the gelled third layer 23 range from 80–90% of the total quantity for the fourth layer 24 and from 10–20% of the total quantity for the fifth layer 26.

We claim:

1. A method of producing a barrier in a thermally insulated container lined with polyurethane foam for storage or transport of liquefied gases, comprising the steps of:

cutting or grinding an inner surface of polyurethane foam previously applied onto an inner surface of a container rigid outer shell to obtain a substantially flat cut or ground surface of polyurethane foam;

applying a first layer of an epoxy resin formulation, comprising an epoxy resin and a curing agent, onto the polyurethane foam cut or ground surface;

allowing the epoxy resin formulation first layer to gel;

applying a second layer of an epoxy resin formulation, comprising an epoxy resin and a curing agent, onto the gelled first layer;

applying a layer of glass-fiber material onto the second layer when the epoxy resin formulation of the second layer is still wet;

compacting the glass-fiber material into the second layer;

applying a third layer of an epoxy resin formulation, comprising an epoxy resin and a curing agent, onto the second layer; and allowing the epoxy resin formulations of the second and third layers to gel.

2. The method of claim 1, including the steps of:

applying a fourth layer of an epoxy resin formulation, comprising an epoxy resin and a curing agent, onto the gelled third layer;

applying a layer of glass-fiber material onto the fourth layer when the epoxy resin formulation of the fourth layer is still wet;

compacting the glass-fiber material into the fourth layer;

applying a fifth layer of an epoxy resin formulation, comprising an epoxy resin and a curing agent, onto the fourth layer; and allowing the epoxy resin formulations of the fourth and fifth layers to gel.

3. A thermally insulated container for storage or transport of liquefied gases, comprising a lining of polyurethane foam arranged on an inner surface of a rigid outer shell, wherein the lining of polyurethane foam is provided with a barrier consisting of glass-fiber material and an epoxy resin system, and wherein the barrier is produced according to a method comprising the steps of:

cutting or grinding an inner surface of polyurethane foam previously applied onto an inner surface of a container rigid outer shell to obtain a substantially flat cut or ground surface of polyurethane foam;

applying a first layer of an epoxy resin formulation, comprising an epoxy resin and a curing agent, onto the polyurethane foam cut or ground surface;

allowing the epoxy resin formulation first layer to gel;

applying a second layer of an epoxy resin formulation, comprising an epoxy resin and a curing agent, onto the gelled first layer;

applying a layer of glass-fiber material onto the second layer when the epoxy resin formulation of the second layer is still wet;

compacting the glass-fiber material into the second layer;

applying a third layer of an epoxy resin formulation, comprising an epoxy resin and a curing agent, onto the second layer; and allowing the epoxy resin formulations of the second and third layers to gel.

* * * * *